Sept. 12, 1933.   A. J. MUSSELMAN   1,926,984
BRAKE
Filed March 12, 1928   2 Sheets-Sheet 1
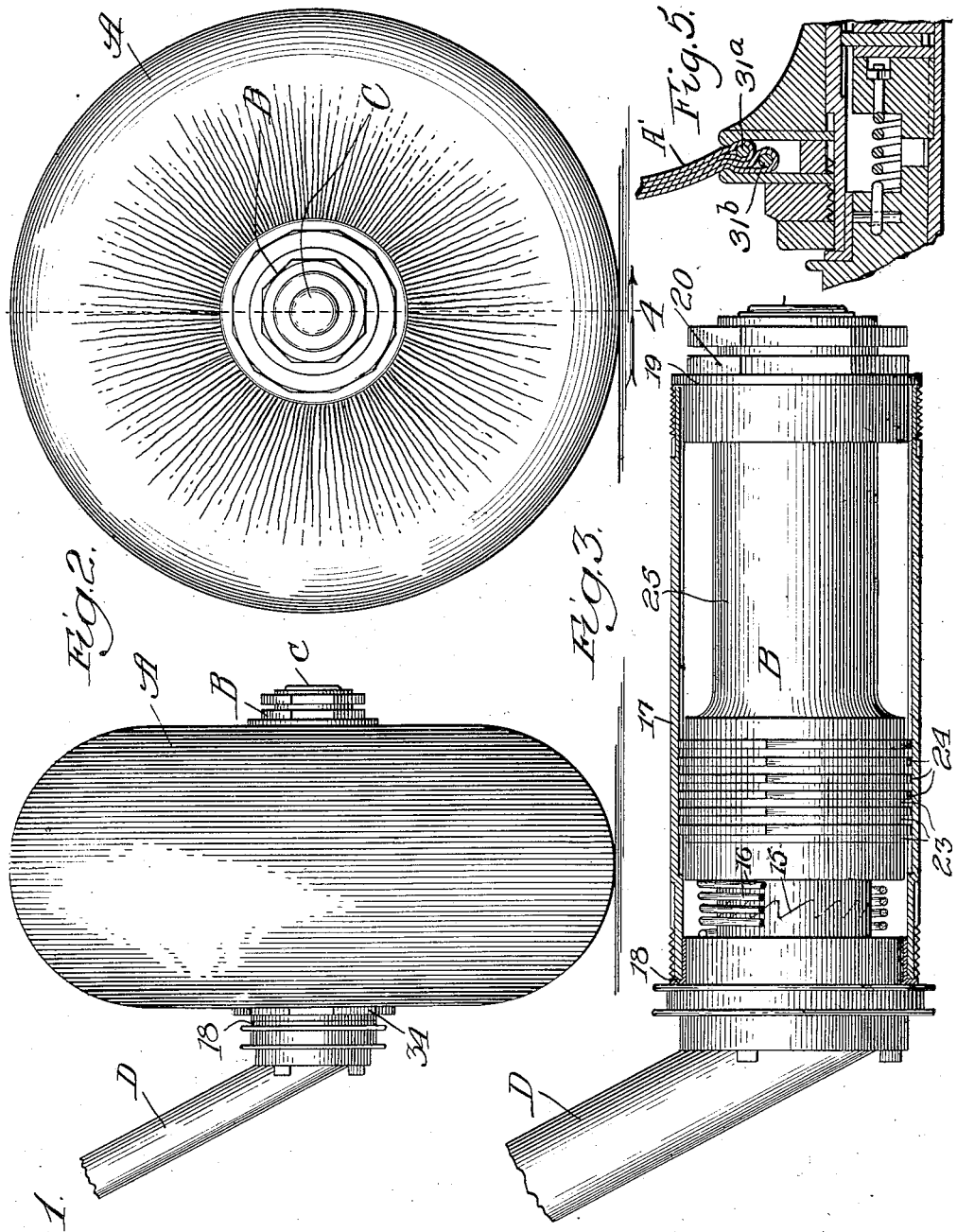

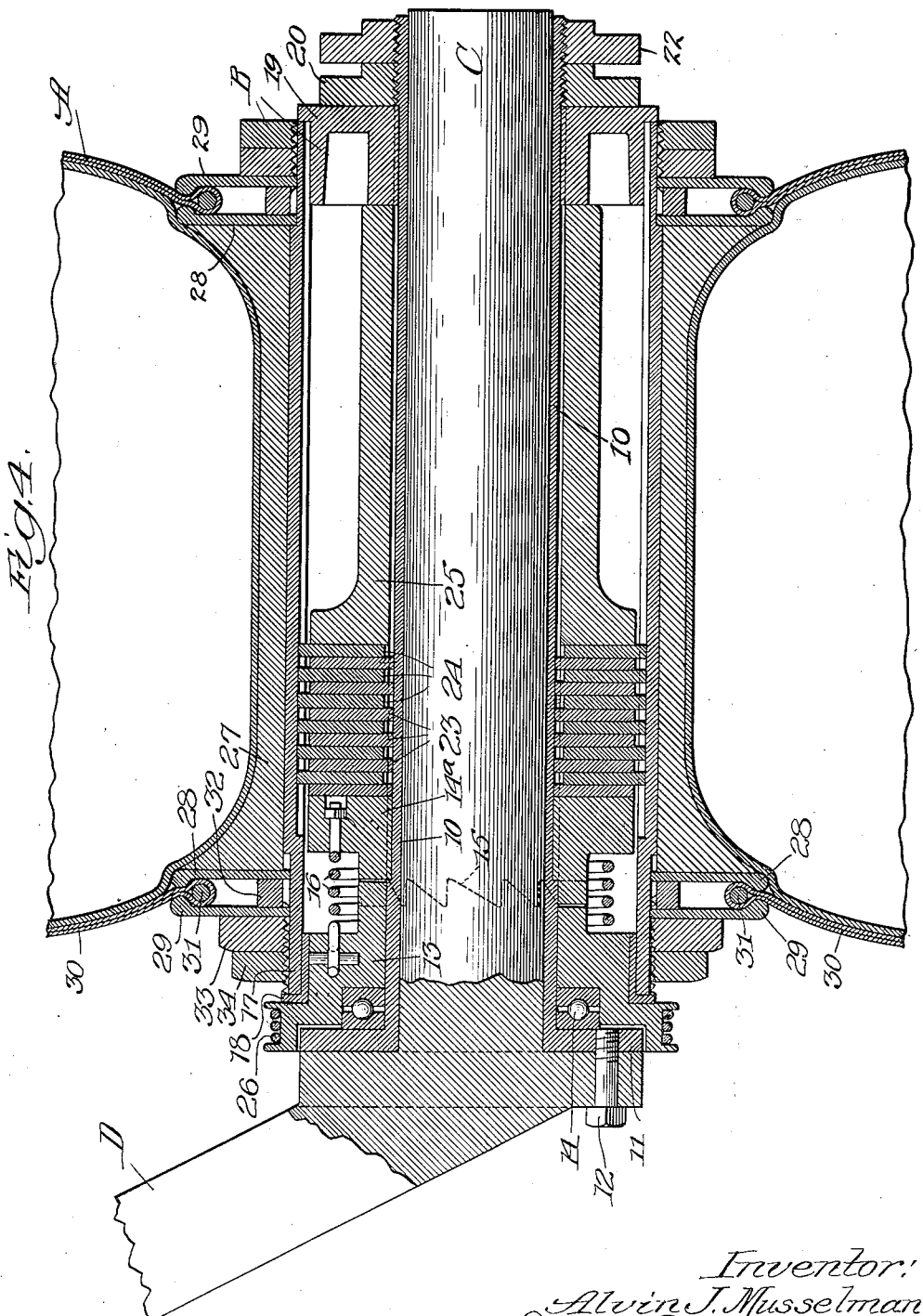

Patented Sept. 12, 1933

1,926,984

UNITED STATES PATENT OFFICE 1,926,984

BRAKE

Alvin J. Musselman, Chicago, Ill., assignor to Wingfoot Corporation, Wilmington, Del., a corporation of Delaware Application March 12, 1928. Serial No. 260,904

6 Claims. (Cl. 188—72)

This invention relates to wheels which are particularly adapted to be used on aeroplanes and the like and is fully described in the following specification and shown in the accompanying drawings, in which:

Figure 1 is a front elevation of an aeroplane wheel embodying the invention;

Fig. 2 is a side elevation of the same;

Fig. 3 is an enlarged longitudinal section through a hub barrel, a brake mechanism therein being shown in side elevation;

Fig. 4 is a view similar to Fig. 3 but to a larger scale and showing all the parts in section;

Fig. 5 is a fragmentary cross-sectional view showing another form of the tire carrying means.

The embodiment illustrated in Figs. 1 to 4 comprises a tire A of the general type described in my pending application Serial No. 203,107, filed July 2, 1927, in which the side walls of the tire are made quite thin and flexible. This tire is carried on a suitable hub B which in turn is mounted to rotate about an axle C which is carried by a support D from the frame of the aeroplane.

Over the axle C is fitted a sleeve 10 which has a flange 11 which is secured to the support D by means of screws 12. A brake member 13 is rotatably mounted on the sleeve 10 and a ball thrust bearing 14 which is provided to take the thrust between the member 13 and the flange 11 as will later be explained.

A second brake member 14ª is keyed to the sleeve 10 and the members 13 and 14ª are provided with complementary teeth 15 so that when the member 13 is rotated it causes the member 14ª to slide endwise on the sleeve 10. A torsion spring 16 connects the members 13 and 14ª and tends to hold the two in contact.

A cylindrical casing or hub barrel 17 is rotatably mounted at one end upon a bronze bearing 18 carried by the member 13. The opposite end of the casing 17 is mounted to rotate upon the bearing member 19 which is carried by the sleeve 10 and retained in place by a nut 20. This nut is locked in place by means of a lock nut 22.

A series of disks 23 are keyed to the sleeve 10 and an alternate set of disks 24 are keyed to the casing 17 while a spacer 25 separates the last of these disks from the bearing member 19. The tire is mounted, as will later be described, upon the casing 17 and this casing normally rotates about the bronze bearings 18 and 19.

The member 13 may be provided with suitable means for turning it. As shown however it is provided with a cable 26 or other flexible member which is wound about it and secured thereto at one end, the opposite end being carried to a convenient point where it is connected to a lever or the like by which it may be pulled to cause the brake member 13 to rotate.

Thus it will be understood that as the member 13 is rotated in a direction away from the observer as shown in Fig. 4, the brake member 14ª will be forced to the right thereby causing friction to occur between the plates 23 and 24 as the wheel is turned.

The casing 17 is adapted to carry a soft flexible low pressure tire of the type previously referred to in my copending application. For this purpose I mount a filler 27 of suitable composition upon the casing 17 and at each end of it is placed spaced annular plates 28, 29 which have inwardly turned beadings on their peripheries which are so formed as to receive the inner edge of the tire casing 30 and the metal ring 31 about which the material of the casing passes. To prevent excessive pressure being applied to the casing 31 between the outer edges of the plates 28 and 29, a spacer 32 is placed between the plates. A nut 33 is screwed upon the outer threaded surface of the casing 17 and a lock nut 34 is also applied thereto.

I have thus provided a very simple yet effective means for mounting the tire on its hub without the interposition of so many parts as are ordinarily considered necessary for this purpose.

In Fig. 5 is shown another form of construction wherein a tire A' of four-ply thickness or having doubled loops at each side, is carried upon two rings 31ª, 21ᵇ which are placed in concentric relation. It will readily be seen that a third ring could be added if it were desired to add still more thicknesses to the wall of the tire. The fabric or cord forming the side walls of the tire A' may be vulcanized together or not as may seem most desirable.

It will thus be seen that I have designed a very simple and effective hub and one which is capable of carrying a tire of very large cross sectional area and one which at the same time, while having only a low air pressure is capable of sustaining very large loads.

While I have shown and described but a single embodiment of this invention, it is to be understood that it is capable of many modifications. Changes therefore in the construction and arrangement may be made which do not depart from the spirit and scope of the invention as disclosed in the appended claims.

I claim:

1. In combination, a hub having a tubular center, a fixed axle about which said hub revolves, disks alternately carried by the hub and axle, a member slidably keyed on by said axle and having inclined surfaces, a second member slidably carried on said axle and having similarly inclined surfaces, said second member being rotatable to cause the first-mentioned member to move endwise as the other member is rotated to force said disks into frictional engagement, and a spring secured by its ends to the opposite members for urging the first-mentioned member toward a retracted position.

2. In combination, a fixed axle, a sleeve secured thereon provided with a longitudinal key-way, a collar secured on the outer end of said sleeve, a thrust-collar journalled on the inner-end-portion of said sleeve and provided with inclined surfaces, a hub-barrel journalled on said collars, said hub-barrel being provided internally with a key-way, a series of disks having projections engaging the key-way of said sleeve, and a series of alternating disks having projections engaging the key-way of the hub-barrel, a tube interposed between said disks and the outer collar, a collar interposed between said thrust-collar and said disks provided with inclined surfaces, a spring connecting said last-named collar and said thrust-collar, and means for turning said thrust-collar to apply braking pressure.

3. In combination, a fixed axle, a sleeve non-rotatably secured on said axle and provided at one end with a thrust-bearing, said sleeve having a longitudinal key-way, a thrust-collar journalled on said sleeve and provided with a co-acting bearing, a companion collar fixed on said sleeve, said collars having co-acting inclined projections, a torsion-spring connecting said collars, a collar secured on the other end of said axle, a hub-barrel journalled on said first-mentioned collar and said last-mentioned collar and provided internally with a longitudinal key-way, disks interposed between said sleeve and said hub-barrel and alternately engaging the key-ways of said sleeve and hub-barrel, and a thrust-sleeve interposed between said disks and said third-mentioned collar.

4. In combination, a fixed axle, a hub-barrel encircling the axle and spaced therefrom, and a brake device interposed between the hub-barrel and axle, comprising disks keyed alternately to the axle and hub-barrel, a pair of co-acting collars having co-acting inclined teeth, one of the collars being slidably keyed to the axle, a torsion-spring connecting said collars, and means for rotating the outer collar to effect braking action.

5. In combination, a frame-member equipped with a projecting axle, a sleeve secured on said axle and having a threaded outer end and provided with a key-way, a rotatable thrust-collar mounted on the inner end of said sleeve, a slidable non-rotating collar mounted on the outer end of said sleeve, a nut securing said last-mentioned collar in position, a hub-barrel journalled on said collars, a collar co-acting with said first-mentioned collar, said co-acting collars having co-acting inclined surfaces, a torsion-spring connecting said co-acting collars, disks keyed alternately to said sleeve and hub-barrel, and a thrust-sleeve interposed between said disks and the collar at the outer end of said axle.

6. In combination, a fixed axle, a sleeve secured thereon provided with a key-way, a hub-barrel spaced from and journalled on the axle, said hub-barrel being provided with a key-way, disks alternately engaging the key-way of said sleeve and the key-way of said hub-barrel, a pair of spring-connected collars having co-acting inclined surfaces, the outer collar being journalled on said s'eeve, and means for rotating said outer collar and the inner collar being slidably keyed to the axle.

ALVIN J. MUSSELMAN.